United States Patent [19]

Seto

[11] Patent Number: 4,575,836
[45] Date of Patent: Mar. 11, 1986

[54] DUAL MODE DISC PLAYER

[75] Inventor: Yasuhiko Seto, Saitama, Japan

[73] Assignee: Pioneer Electronic Corporation, Tokyo, Japan

[21] Appl. No.: 576,823

[22] Filed: Feb. 3, 1984

[30] Foreign Application Priority Data

Dec. 22, 1983 [JP] Japan .......................... 58-197976[U]

[51] Int. Cl.$^4$ ...................... G11B 15/30; G11B 15/44; G11B 25/04
[52] U.S. Cl. .................................... 369/265; 369/197; 369/258; 369/263; 369/267
[58] Field of Search ............... 369/264, 265, 266, 267, 369/258, 263, 197, 198; 310/112, 268; 318/115

[56] References Cited

U.S. PATENT DOCUMENTS

| | | | |
|---|---|---|---|
| 1,395,035 | 10/1921 | Briggs | 369/197 |
| 1,461,111 | 7/1923 | Daniels | 369/197 |
| 1,727,263 | 9/1929 | Yeager et al. | 369/197 |
| 1,885,006 | 10/1932 | Daily | 369/197 |
| 2,573,011 | 10/1951 | Gruber | 369/267 |
| 3,097,850 | 7/1963 | Curci | 369/197 |
| 3,844,571 | 10/1974 | Mensier | 369/266 |
| 4,470,136 | 9/1984 | Takahashi et al. | 369/194 |

Primary Examiner—Steven L. Stephan
Attorney, Agent, or Firm—Sughrue, Mion, Zinn, Macpeak, and Seas

[57] ABSTRACT

A disc player comprises a first driver for driving a first turntable for a first kind of an information-recorded disc, a second driver for driving a second turntable for a second kind of an information-recorded disc, a single holder for holding thereon the first and second drivers, holder drive means for driving the holder, and a pickup for reproducing signals from one of the first and second kinds of information-recorded discs at a predetermined play position, in which the single holder is moved so that one of the first and second kinds of information-recorded disc is selectively positioned at the predetermined play position.

10 Claims, 5 Drawing Figures

DUAL MODE DISC PLAYER

BACKGROUND OF THE INVENTION

The present invention relates to a disc player which is capable of playing both audio and video discs by means of a single pickup and more particularly to a disc player which is capable of placing accurately a plurality of spindle motors.

In the prior art, no system has been proposed which can play both audio discs and video discs with a single pickup. Different player systems have been required for playing the two discs.

More specifically, in a compact disc player (which will be referred to as "CD") or an optical type video disc player (which will be referred to as "LD"), a label indicating the content of the play has to be viewed by the operator (i.e., must be placed on the upwardly-facing disc side in case the disc is played in a horizontal position), while the signals should be read out from the lower side of the disc if automatic disc-loading or clamping operations are desired.

However, in the compatible player which is capable of playing both kinds of discs (i.e., in which the center of rotation for playing the two discs is common and in which a common pickup is used), the clamping area of the LD and the read-in of the CD overlap, making it necessary to interchange the turntables.

SUMMARY OF THE INVENTION

Therefore, an object of the present invention is to eliminate the aforementioned defects.

According to the invention, there is provided a disc player which is characterized: in that a rotary driver for a video disc and a rotary driver for an audio disc are attached to a single holder; in that one of said rotary drivers is brought to a playing position by turning said holder; and in that a single pickup is disposed in said playing position, whereby the two discs are selectively played by said single pickup.

The present invention provides as an object a disc player which can fix one of a plurality of spindle motors in a predetermined playing position with high accuracy.

According to the present invention, there is provided a disc player comprising first drive means for driving a first turntable for a first kind of an information-recorded disc, second drive means for driving a second turntable for a second kind of an information-recorded disc, a single holder means for holding thereon said first and second drive means, holder drive means for driving said single holder means, pickup means for reproducing a signal from one of said first and second kinds of information-recorded disc when one of said discs is at a predetermined play position, and means for moving said single holder means and for locating said single holder means so that one of said first and second kinds of information-recorded disc is selectively positioned at said predetermined play position.

According to the present invention, there is provided said first drive means having a spindle and a motor, said second drive means having a spindle and a motor, said holder drive means moving said holder means in a predetermined range, said disc player further comprising a pair of movable members provided near the endpoints of said predetermined range and means for biasing said movable members to move in opposite directions away from a center of said predetermined range.

DETAILED DESCRIPTION OF THE PREFERRED EMBODIMENTS

Figure 1:
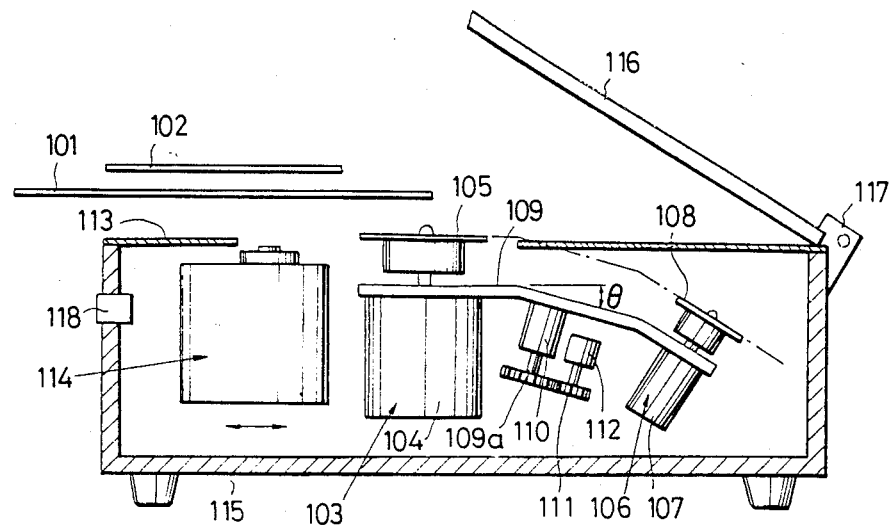
FIG. 1 is a view showing a primary part of a first embodiment of a disc player.

The present invention will now be described by way of example with reference first to FIG. 1. FIG. 1 is a sectional view showing an information-recorded disc player according to the present invention, in which reference numerals 101 and 102 indicate a video disc and an audio disc. Numeral 103 indicates a rotary driver for the video disc 101, which is constructed of a spindle motor 104 and a turntable 105. Numeral 106 indicates a rotary driver for the audio disc 102, which is constructed of a spindle motor 107 and a turntable 108. Incidentally, disc clamps are omitted from both the rotary drivers 103 and 106. Indicated at numeral 109 is a motor holder which has a shaft 109a protruding from the center thereof. This shaft 109a is rotatably borne by means of a bearing 110 and is connected through a reduction gear 111 to a turning motor 112. Moreover, the motor holder 109 has the rotary driver 103 of the video disc 101 mounted at one end and the rotary driver 106 of the audio disc 102 mounted at the other end. Furthermore, the motor holder 109 is bent at an angle $\theta$ and its shaft 109a is mounted at an angle so that one rotary driver 103 or 106 may be turned by 180° to the play position at the center of a decorative plate 113, from which the turntable 105 or 108 protrudes slightly.

A pickup 114 is arranged in the aforementioned play position so that it can move radially of the two discs 101 and 102. If the two discs 101 and 102 are of the contactless optical type, the pickup 114 is an optical type, and if the discs 101 and 102 are of the electrostatic capacity type, it is an electrostatic capacity type.

A cabinet 115 has a hood 116 hinged at 117 so that it can be opened and closed. A select button 118 is used to determine which of the rotary drivers 103 and 106 should be used. This select button 118 is set so that it can operate when the hood 116 is open.

The operations of the aforementioned embodiment will be described as follows. At first, the hood 116 is opened, and the select button 118 is depressed. Then, the drive motor 112 rotates to transmit its turning force through the reduction gear 111 to the shaft 109a. Then, the motor holder 109 is turned by 180° on its shaft 109a so that the desired rotary driver 103 or 106 comes to the play position whereas the other rotary driver 103 or 106 comes below the decorative plate 113. Next, on the turntable 105 or 108 of the rotary driver 103 or 106, the video disc 101 or the audio disc 102 is loaded in the play position. After this, the hood 116 is closed to establish the play state, in which the pickup 114 runs from the innermost signal path to the outermost one of the video disc 101 or the audio disc 102 to read out the information signals recorded on the disc 101 or 102.

Incidentally, the aforementioned embodiment is exemplified by the top-loading type but can be applied to a front-loading type. As means for selecting the two rotary drivers 103 and 106, the select button 118 is used, but an automatic detecting mechanism such as a light-receiving element may be used.

The angle by which the motor holder 109 is turned need not be limited to 180°. The angle need only be such that one rotary driver 103 or 106 comes below the decorative plate 113 in the case of the top loading type. Similarly, the angle of inclination $\theta$ of the motor holder 109 may be suitably determined. In the embodiment shown, the motor holder 109 is turned at the fixed position, i.e., on its shaft 109a. However, one rotary driver 103 or 106 may be brought to the play position by turning the motor holder 109 once it is lowered and lifting it again.

As has been described hereinbefore, according to the present invention, the rotary driver 103 for the video disc 101 and the rotary driver 106 for the audio disc 102 are attached to the single holder 109 such that one rotary driver 103 or 106 can be brought to the playing position by turning the holder 109, and the single pickup 114 is disposed in the playing position so that both the video disc 101 and the audio disc 102 can be selectively played. Since the two rotary drivers 103 and 106 and the single pickup 114 are integrated, the disc player can be small.

Figure 2:
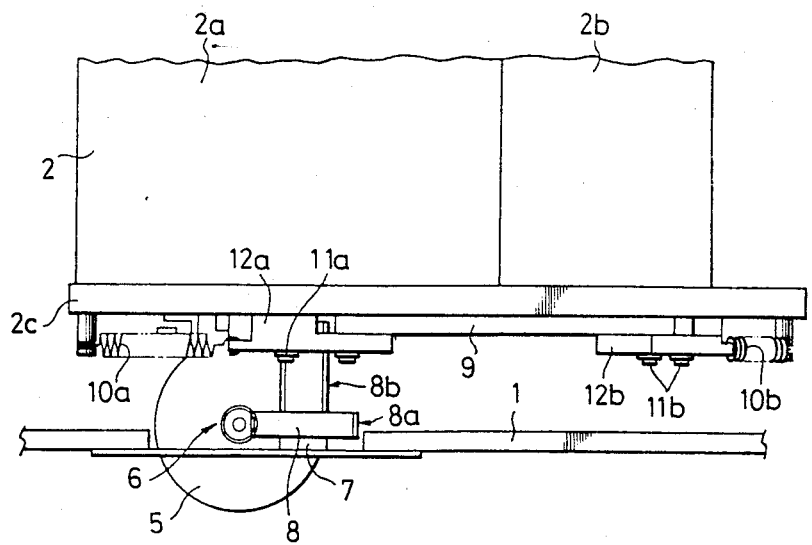
FIG. 2 is a top plan view showing a spindle motor interchanging device according to a second embodiment of the disc player of the present invention.
Figure 3:
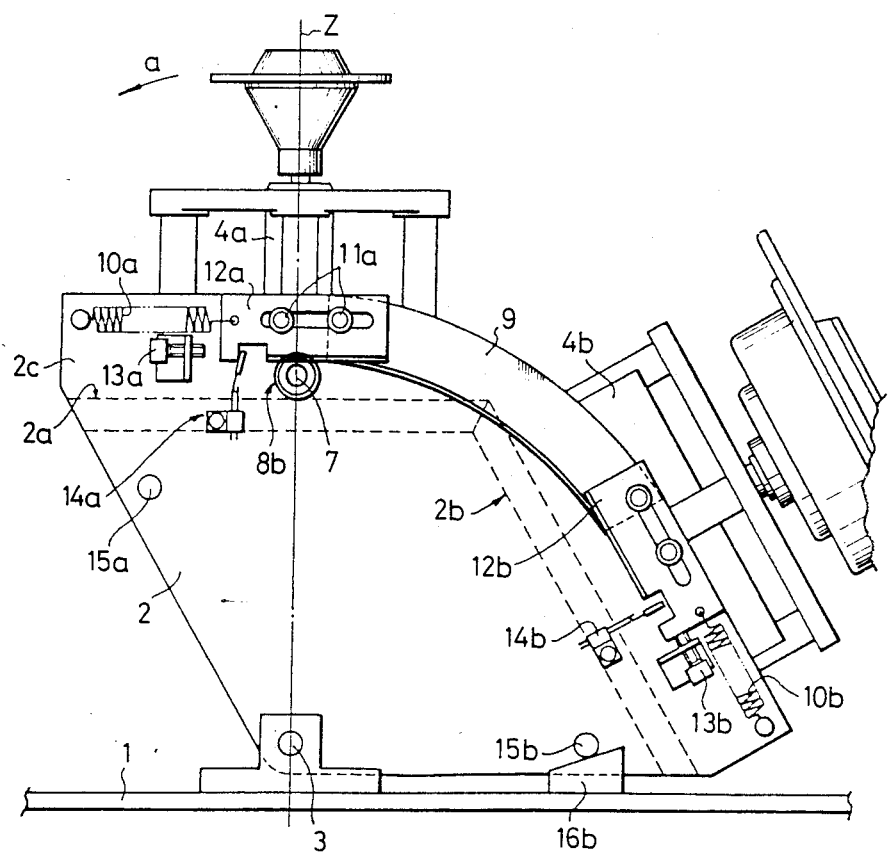
FIGS. 3, 4(A) and 4(B) are respective side views of the disc player shown in FIG. 2.

FIGS. 2 to 4 show another embodiment of the invention having a mechanism in which motor mounting tables respectively having special spindle motors fixed thereon are swingable to change the motors.

The spindle motors have to be positioned accurately, and neither vibration nor misalignment is allowed during an eccentric disc play (e.g., an unbalanced force of 1.5N is allowed for the LD standards).

For this purpose, it is necessary to satisfy the following conditions:

(1) The positionings must be simple to adjust and can enjoy reproducibility.
(2) At the positioned points, the spindle motors must be fixed without looseness or backlash in their rocking and drive mechanisms.
(3) Conditions (1) and (2) must be satisfied for both spindle motors.

Figure 4A:
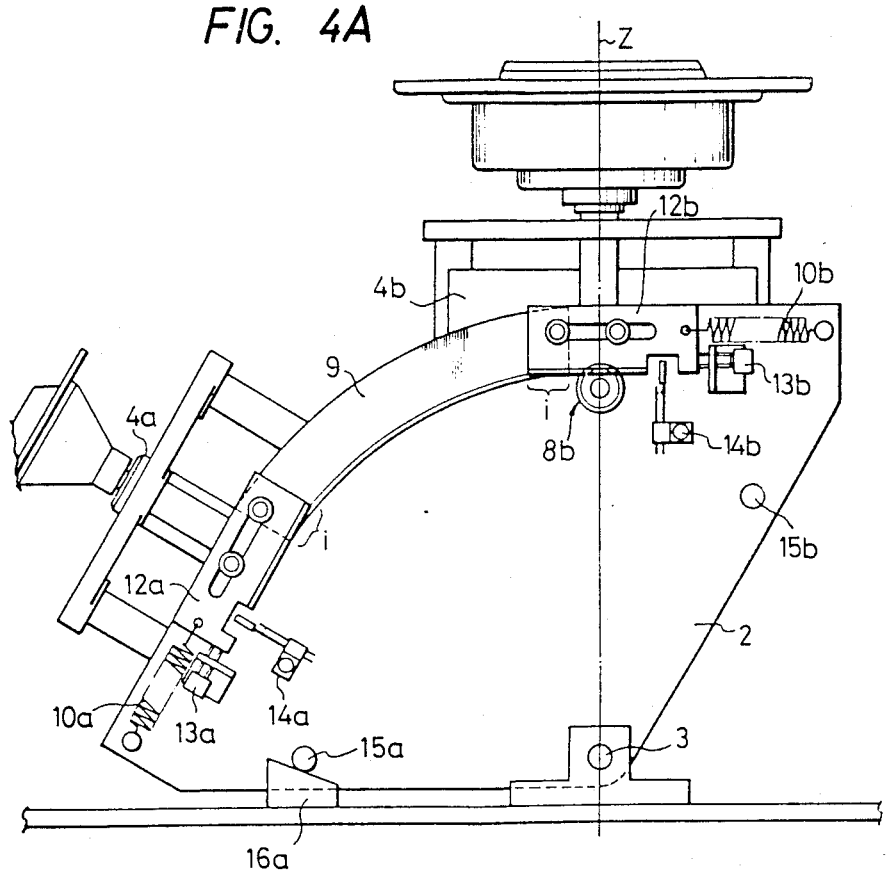
Figure 4B:
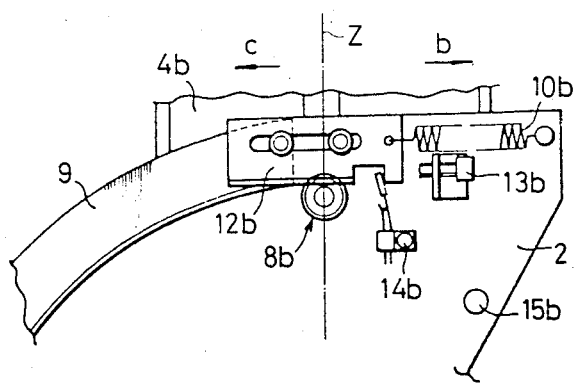

FIG. 2 is a top plan view showing a spindle motor interchanging device according to the embodiment of the invention. FIGS. 3, 4(A) and 4(B) are side views of the same, respectively. In FIGS. 3 and 4, an axis Z provides a predetermined position of the spindle motors. Indicated at numeral 2 is a motor mounting table which is so attached to a chassis 1 acting as a base that the motor mounting table 2 can rock or swing about a pin 3. In other words, the motor mounting table 2 has the shape of a circular sector which has its base portion hinged to the pin 3 fixed to the chassis 1.

The motor mounting table 2 is formed with spindle motor mounting top faces 2a and 2b, on which are respectively fixed spindle motors 4a and 4b.

On the chassis 1, there is mounted a drive motor 5. To this drive motor 5, there is attached a worm gear 6. The worm gear 6 meshes with the worm wheel 8a of a gear 8 which constitutes speed-reducing means together with the worm gear 6.

The gear 8 is rotatably borne on a gear shaft 7. This gear shaft 7 is fixed to the chassis 1. The gear 8 is formed with a spur gear 8b, which is adapted to come into engagement with racks 12a and 12b as the motor mounting table 2 turns on the pin 3.

An internal gear 9 is fixed on the side 2c of the motor mounting table 2. To each end of that side 2c one end of respective tension springs 10a and 10b is fixed.

Thus, as the motor mounting table 2 turns about the pin 3, as described above, the spur gear portion 8b of the gear 8 comes into meshing engagement with the racks 12a and 12b which are biased outwardly by the action of the tension springs 10a and 10b and are made slidable along guides 11a and 11b.

To the side 2c of the motor mounting table 2, adjusting screws 13a and 13b are attached. Onto these adjusting screws 13a and 13b are pressed the racks 12a and 12b which are biased by the tension springs 10a and 10b.

To the side of the motor mounting table 2, there are attached drive motor stop switches 14a and 14b, and positioning pins 15a and 15b. These positioning pins 15a and 15b are adapted to abut against stops 16a and 16b, which are attached to the chassis 1, so that spindle motors 4a and 4b may be fixed in predetermined positions.

The operation of the disc player having the construction according to the present invention as described thus far will now be explained.

FIG. 3 shows the operational state in which the spindle motor 4a is fixed on the axis Z.

First, when the drive motor 5 is actuated, the drive force of the motor 5 is transmitted to the worm gear 6, the gear 8 and the rack 12a so that the spindle motor mounting table 2 is turned on the pin 3 in the direction of arrow a.

As is apparent from FIG. 4(A), moreover, if the tooth shape of the overlapped portions i of the racks 12a and 12b and the internal gear 9 are identically threaded by the adjusting screws 13a and 13b, the gear 8 meshes with the rack 12a, the internal gear 9 and the rack 12b in that order.

If the motor mounting table 2 further turns in the direction of arrow a so that the positioning pin 15a abuts against the stop 16a, as shown in FIG. 4(A), the motor mounting table 2 is stopped so that the spindle motor 4b comes into alignment with the axis Z.

Since the drive motor 5 continues to rotate, the rack 12b, which has been biased in the direction of arrow b in FIG. 4(B) by the tension spring 10b, is slid in the direction of arrow c in FIG. 4(B). When the drive motor stop switch 14b is depressed, the rotations of the drive motor 5 are stopped to interrupt the rack 12b.

This is the state in which the motor mounting table 2 is forced to contact with the stop 16a by the tension of the tension spring 10b.

Incidentally, the aforementioned embodiment is exemplified by the case in which the pin hinging the motor mounting table 2 rotates about the horizontal axis fixed horizontally at the chassis 1. However, the spindle motors may rotate on a vertical axis, move in a horizontal direction or reciprocate along other various paths.

On the other hand, the driven gear is exemplified by the combination of the internal gear 9 and the racks 12a and 12b but a gear having another shape in accordance with the aforementioned paths may be used.

In the aforementioned embodiment, furthermore, the drive motor 5 is mounted on the chassis 1 whereas the driven gear is attached to the motor mounting table 2 of the spindle motors, but this arrangement may be reversed.

In the aforementioned embodiment, the gears are used as the driving power transmitting means, but friction wheels or plates may be used if the frictional forces are sufficient.

In the aforementioned embodiment, two spindle motors are used, but three or more spindle motors may be used.

According to the disc player of the present invention, as described above, the rack is divided into plural parts so that the spindle motors can be fixed at both ends of the paths of the reciprocal motions.

Moreover, not only the back-lash of the gear but also the looseness due to the dimensional errors of the respective members can be absorbed, and the shocks when the positioning pins abut against the stops can be absorbed because the racks are mounted by means of the springs. As a result, the spindle motors can be replaced quickly.

Further, even if the drive motor is stopped with the positioning pins being in reliable abutment against the stops, no load is applied to the motor and other members with the resultant effect that the positioning operations can be accurately conducted.

I claim:

1. A disc player comprising:
   first drive means for rotating a first turntable for a first kind of an information-recorded disc,
   second drive means for rotating a second turntable for a second kind of an information-recorded disc different from said first kind,
   a single holder means for holding thereon said first and second drive means,
   holder drive means for moving said single holder means along a predetermined path,
   a pair of movable members provided on said single holder means near endpoints of said predetermined path,
   means for biasing each of said movable members to move away from the center of said predetermined path toward its respective endpoint,
   means for positioning said single holder means so that one of said first and second kinds of information-recorded disc is selectively positioned at a predetermined play position, and
   pickup means for reproducing signals from said one of said first and second kinds of information-recorded disc when said one of said discs is at said predetermined play position.

2. The disc player of claim 1, said single holder means being swingable about a predetermined axis.

3. The disc player of claim 2, said first drive means having a spindle and a motor, said second drive means having a spindle and a motor.

4. The disc player of claim 3, said holder drive means including an arcuate rack, a pinion gear engaging said arcuate rack along the outer circumference thereof.

5. The disc player of claim 4, each of said movable members having a rack portion engaging said pinion gear.

6. The disc player of claim 3, a rotational axis of said pinion gear being located along a predetermined stationary line.

7. The disc player of claim 3, further comprising guide means for guiding each of said movable members.

8. The disc player of claim 3, said means for positioning said holder means including a plurality of stationary stop members abutting against said holder means.

9. The disc player of claim 5, including means for adjusting a position of each of said rack portions relative to said arcuate rack of said holder means.

10. The disc player of claim 9, further including means for detecting positions of said movable members.

* * * * *